(12) United States Patent
Carlisle et al.

(10) Patent No.: US 11,888,880 B1
(45) Date of Patent: *Jan. 30, 2024

(54) SYSTEMS AND METHODS FOR DETECTING KEYBOARD CHARACTERISTICS

(71) Applicant: United Services Automobile Association (USAA), San Antonio, TX (US)

(72) Inventors: Billy Dwayne Carlisle, Windcrest, TX (US); Robert Jason Neel, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 9 days.

This patent is subject to a terminal disclaimer.

(21) Appl. No.: 17/852,128

(22) Filed: Jun. 28, 2022

Related U.S. Application Data

(63) Continuation of application No. 16/254,143, filed on Jan. 22, 2019, now Pat. No. 11,418,522.

(60) Provisional application No. 62/620,058, filed on Jan. 22, 2018.

(51) Int. Cl.
| | |
|---|---|
| *H04L 9/40* | (2022.01) |
| *G06F 3/023* | (2006.01) |
| *G06F 40/232* | (2020.01) |
| *H04N 7/14* | (2006.01) |

(52) U.S. Cl.
CPC ........ *H04L 63/1425* (2013.01); *G06F 3/0233* (2013.01); *G06F 40/232* (2020.01); *H04L 63/083* (2013.01); *H04L 63/1416* (2013.01); *H04N 7/141* (2013.01)

(58) Field of Classification Search
CPC ............. H04L 63/1425; H04L 63/083; H04L 63/1416; G06F 3/0233; G06F 40/232; H04N 7/141
USPC .......................................................... 726/23
See application file for complete search history.

(56) References Cited

U.S. PATENT DOCUMENTS

| | | | | |
|---|---|---|---|---|
| 6,405,922 | B1* | 6/2002 | Kroll | G06K 5/00 |
| | | | | 235/383 |
| 2003/0118973 | A1* | 6/2003 | Noble | G09B 19/04 |
| | | | | 434/167 |
| 2006/0020595 | A1* | 1/2006 | Norton | G06F 16/90344 |
| 2006/0129832 | A1* | 6/2006 | Abedi | G06F 21/31 |
| | | | | 713/183 |
| 2010/0158238 | A1* | 6/2010 | Saushkin | G10L 25/48 |
| | | | | 379/265.12 |
| 2011/0223576 | A1* | 9/2011 | Foster | G09B 7/02 |
| | | | | 434/362 |
| 2011/0320816 | A1* | 12/2011 | Yao | G06F 21/566 |
| | | | | 713/176 |
| 2014/0272882 | A1* | 9/2014 | Kaufman | G09B 5/065 |
| | | | | 434/308 |
| 2015/0213246 | A1* | 7/2015 | Turgeman | G06F 21/32 |
| | | | | 726/23 |

(Continued)

*Primary Examiner* — Badri Narayanan Champakesan
(74) *Attorney, Agent, or Firm* — Fletcher Yoder P.C.

(57) ABSTRACT

A keyboard detection system, that includes a processor that operates to detect at least one anomaly in input data and determine a correlation between the at least one anomaly and a characteristic of an inconsistent keyboard type. The processor may operate to determine the correlation between the at least one anomaly and the characteristic of the inconsistent keyboard type based on a lookup table or algorithm.

19 Claims, 8 Drawing Sheets

(56) References Cited

U.S. PATENT DOCUMENTS

| | | | |
|---|---|---|---|
| 2015/0310196 A1* | 10/2015 | Turgeman | H04W 12/06 726/19 |
| 2016/0191554 A1* | 6/2016 | Kaminsky | H04L 63/1425 726/23 |
| 2016/0371476 A1* | 12/2016 | Turgeman | G06F 21/31 |
| 2017/0054702 A1* | 2/2017 | Turgeman | G06F 21/31 |
| 2017/0085587 A1* | 3/2017 | Turgeman | G06F 3/03547 |
| 2017/0091450 A1* | 3/2017 | Turgeman | H04W 12/06 |
| 2017/0193526 A1* | 7/2017 | Turgeman | G06F 21/31 |
| 2019/0220583 A1* | 7/2019 | Douglas | G06F 21/32 |

* cited by examiner

SYSTEMS AND METHODS FOR DETECTING KEYBOARD CHARACTERISTICS

CROSS-REFERENCE TO RELATED APPLICATIONS

This application claims priority to U.S. patent application Ser. No. 16/254,143, entitled "SYSTEMS AND METHODS FOR DETECTING KEYBOARD CHARACTERISTICS," filed Jan. 22, 2019, which claims priority to and the benefit of U.S. Provisional Application No. 62/620,058, entitled "SYSTEMS AND METHODS FOR DETECTING KEYBOARD CHARACTERISTICS," filed Jan. 22, 2018. These applications are hereby incorporated by reference in their entireties for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

The present disclosure relates generally to monitoring and analyzing various types of communications and interactions. More specifically, the present disclosure relates to monitoring transmitted information to facilitate detecting certain characteristics associated with the transmitted information. Once detected, these characteristics may be utilized for various analytical and active purposes. For example, identified input characteristics may be used to analyze, detect, and defeat fraudulent access attempts and/or fraudulent uses of systems or accounts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a keyboard detection system, comprises a processor that operates to detect at least one anomaly in input data and determine a correlation between the at least one anomaly and a characteristic of an inconsistent keyboard type. The processor may operate to determine the correlation between the at least one anomaly and the characteristic of the inconsistent keyboard type based on a lookup table or algorithm.

In another embodiment, a keyboard detection system includes a processor that detects input data. The processor also detects an account associated with the input data. The processor determines a typing signature associated with the account, and compares input data to the typing signature to detect anomalies. The processor activates a fraud application such that access to the account is limited and/or blocked in response to a detected anomaly.

In another embodiment, a keyboard detection system includes a processor that detects at least one anomaly in input data. The processor detects an account associated with the input data. The processor determines a correlation between the at least one anomaly and a characteristic of an inconsistent keyboard type based on a lookup table or algorithm. The processor activates a fraud application such that access to the account is limited and/or blocked in response to a detected anomaly.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
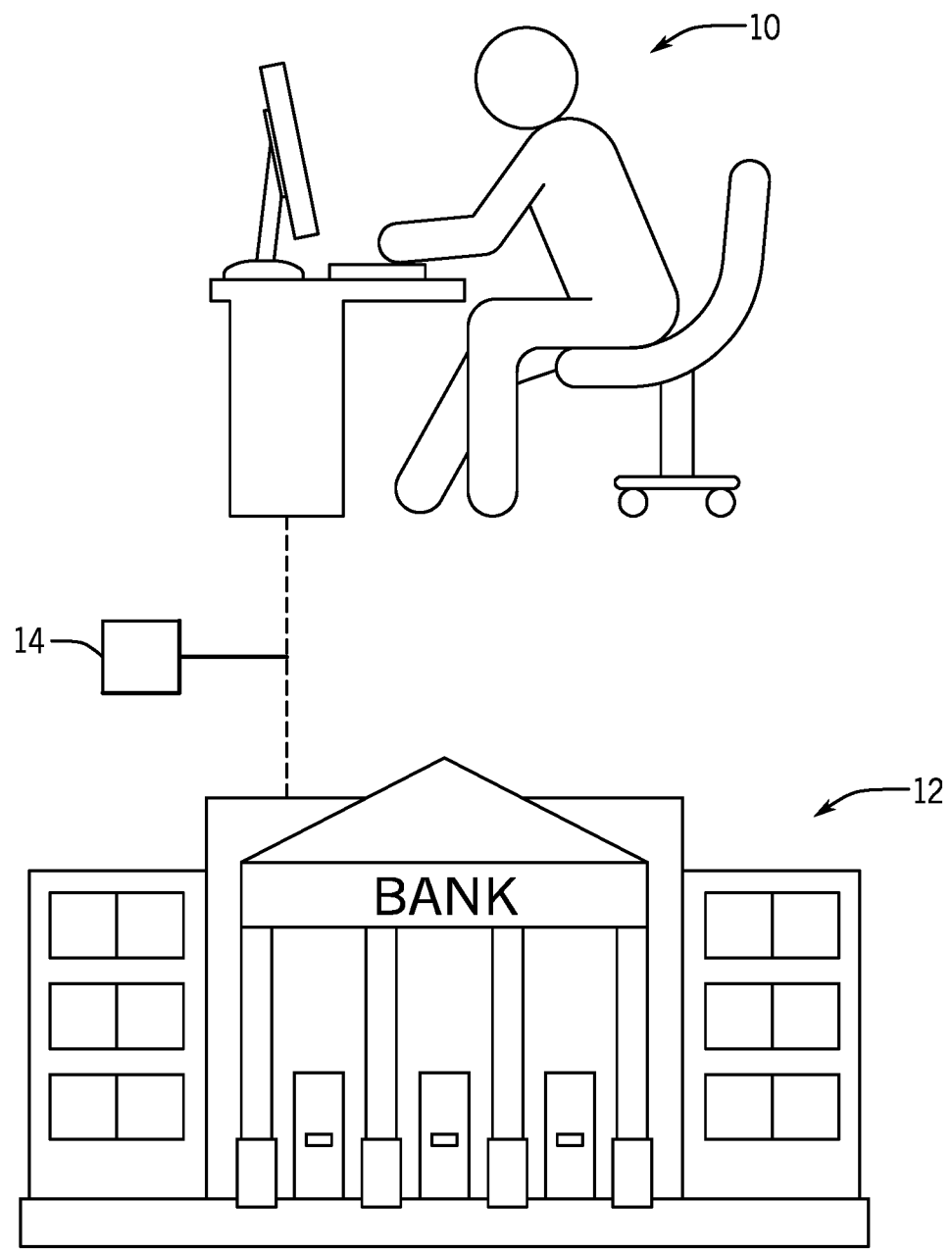
FIG. 1 illustrates a schematic view of a user accessing an account of an institution, wherein the access is being monitored by a system in accordance with present embodiments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Foreign language keyboards are often used to generate characters (e.g., numerals or text) in a local or non-foreign language. In order to produce these characters on a foreign language keyboard, the user may have to use alt codes. Alt codes are generated by pushing the alt button in combination with characters (e.g., foreign characters or numbers) to produce a character from the non-foreign alphabet. For example, on a non-English keyboard, a combination of the "Alt" button and entry of the number 84 (indicated by "alt+84") may be used to enter the capital letter "T" when English is the language being employed for communication. The complication of pressing alt in combination with these numbers may lead to a user accidently typing in 84, alt+85, alt+83, and so forth, instead of the appropriate alt+84 when attempting to type a capital "T" (e.g., when entering a username or password). In accordance with present embodiments, such mistakes may be detected as a component of operation of a keyboard detection system. Further, the keyboard detection system may utilize such mistakes to determine a likely keyboard layout that is associated with the mistakes, which may include indications of an inconsistency between the account holder's native/expected language and a characteristic of the detected keyboard. For example, if an account holder's primary language is English and the account holder has previously accessed the account using an English language keyboard layout, the detection of a keyboard layout for another language may indicate an attempt by a hacker to gain access to the account. Indeed, the traditional language employed by the account holder does not match the non-English characteristic of the detected keyboard in this example. Thus, the keyboard detection system may flag the account, the session, or the like for heightened scrutiny before providing access to the account. It should be noted that, in the present example, the non-English language keyboard would be considered a foreign keyboard. However, in other situations, an English language keyboard would be considered foreign.

Bad actors are continuously trying to access and steal sensitive information from various institutions, including financial account information. The information they obtain may enable them to steal financial resources and/or obtain sensitive information that may be exploited in other ways. It has been estimated that over 90% of the global attack traffic originates outside of the United States. Some of these countries include China, Russia, Romania, North Korea, among others. The native language in these countries is not English. However, many of the targets of the attacks utilize systems that employ the English language. Therefore many of these criminals, foreign agents, and so forth use keyboards that reflect their non-English alphabets or characters. When these bad actors attempt to access an account at a U.S. institution they may have to type in usernames and passwords that contain characters from the English alphabet. Likewise, when an English keyboard is used to access an account that utilizes a non-English language (e.g., outside of the U.S.), special codes may be utilized to provide specialized characters in usernames and passwords. While usernames and passwords are set forth above as examples and while they may be of particular interest for monitoring purposes, other information (e.g., data provided in a form or a communication) may also monitored. Such information may be fully observed or it may be limited to detection of anomalies that are then associated with characteristics of an inconsistent keyboard type, as identified by algorithms or lookup tables that associate the typical anomalies (or errors) with certain types of keyboards. By limiting this type of monitoring to reports of such anomalies, data processing efficiencies may be achieved.

In addition to detecting the use of a particular keyboard layout, the keyboard detection system, may also monitor the keystrokes of a user and create a profile based on common mistakes of the user (e.g., an account holder). These repeated mistakes may form a type of signature that enables the keyboard detection system to identify and authenticate that the actual user is the one providing input data (e.g., via accessing and using an account). For example, if an account holder typically types "chaange" instead of "change" the keyboard detection system may recognize this as a common error by the account holder and therefore enable the account holder to continue using the account without heightened security. In contrast, if the user makes repeated mistakes that are not typically associated with the user (e.g., characters not associated with the language of the account holder, other types of spelling mistakes), the keyboard detection system may flag the account for heightened scrutiny to protect the account from unauthorized use.

Present embodiments may be utilized to thwart hacking, to confirm user authorizations (e.g., without or in addition to existing protocols), and for other purposes as well. For example, in one embodiment, a diagnostic may be performed on a server or some other access target. The diagnostic may reveal the locations and likely keyboard types associated with all attempted and/or successful access attempts for the particular server (or other access target) being monitored. Information such as this may facilitate high-level analytics associated with security, service improvement, and the like.

FIG. 1 illustrates a schematic view of a user 10 accessing an account of an institution 12, such as a financial institution, wherein the access is being monitored by a system 14 in accordance with present embodiments. Other accounts may include social media accounts, store accounts, entertainment accounts, email accounts, work accounts, and so forth. In order to access such accounts, the user 10 may type in usernames and passwords, after which the user may perform a variety of functions, including transferring funds, typing messages, ordering products, among others. As the user performs these tasks, he or she pushes buttons on a keyboard, which allow characteristics of that keyboard to be detected by the system 14. In some situations, an inconsistent keyboard may be detected based on anomalies (e.g., typographical errors that suggest codes are being used, such as alt codes). As a specific example, errors typically associated with the use of alt codes (as determined via a lookup table or algorithm) may indicate the use of a foreign keyboard layout (e.g., a keyboard for a language not typically used for the type of access being monitored). This may indicate the user is a likely hacker attempting to gain unauthorized access to or use the account and the system may take preemptive measures to defeat the hack. It should be noted that the term foreign keyboard layout may include a keyboard layout that is not associated with a detected geographic region, a particular user, a particular account or the like. For example, an English language keyboard layout would be typically associated with a user in an English speaking country. An attempt to access an account from a U.S. internet protocol (IP) address with a Chinese keyboard layout could therefore indicate either a Chinese speaker is attempting to gain access to an account or that a Chinese hacker is spoofing the U.S. IP address while attempting to gain access to or fraudulently use another's account. Thus, by detecting use of a foreign keyboard layout, an institution is able to flag the use for review and block unauthorized access or prevent continued unauthorized access where appropriate.

Figure 2:
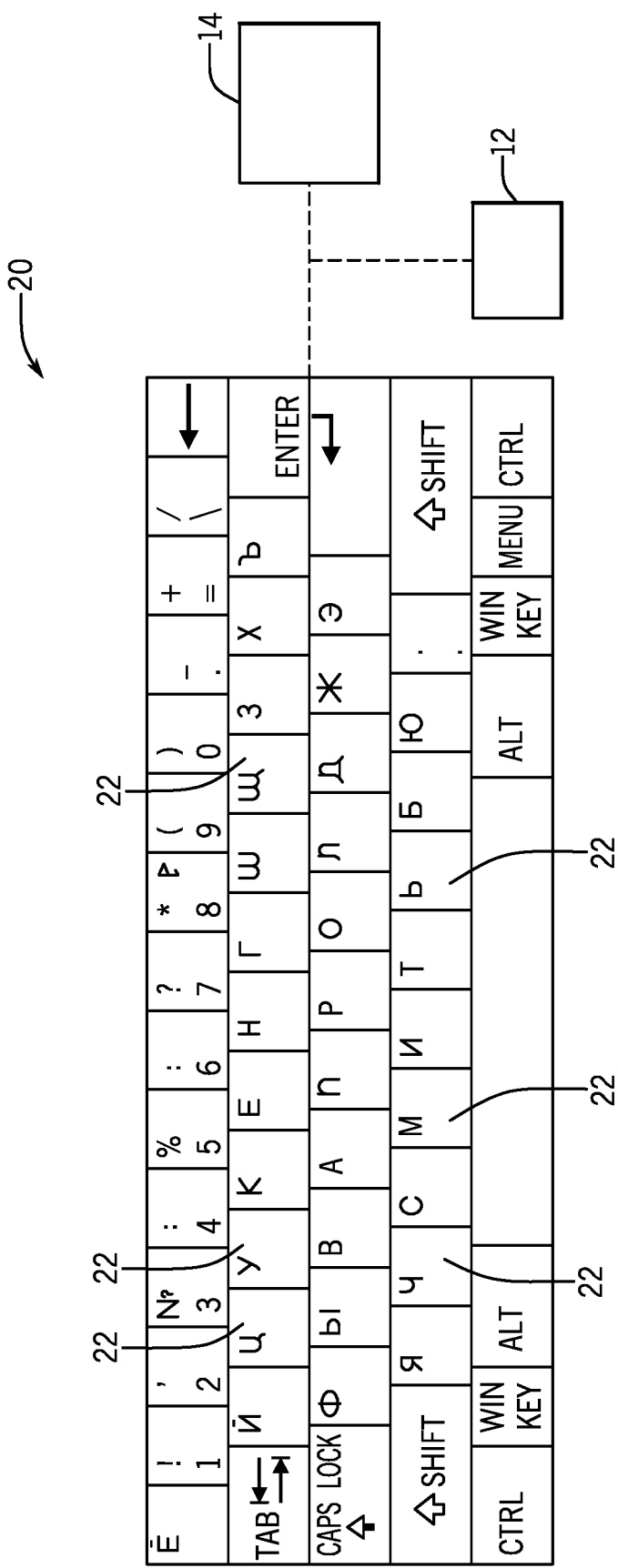
FIG. 2 illustrates a schematic view of a Cyrillic keyboard providing input that is being detected by a system in accordance with embodiments described herein.

FIG. 2 illustrates a schematic view of a Cyrillic keyboard 20 providing input to an account of an institution 12 that is being detected by a system 14 in accordance with present embodiments. As illustrated, many of the keyboard keys 22 represent characters that are essentially useless in typing in an English language based username, password, messages, form entry, or the like. The user would therefore have to use a different keyboard and/or special codes to type in the English language characters. One example of special codes may include the above-referenced alt codes.

Figure 3:
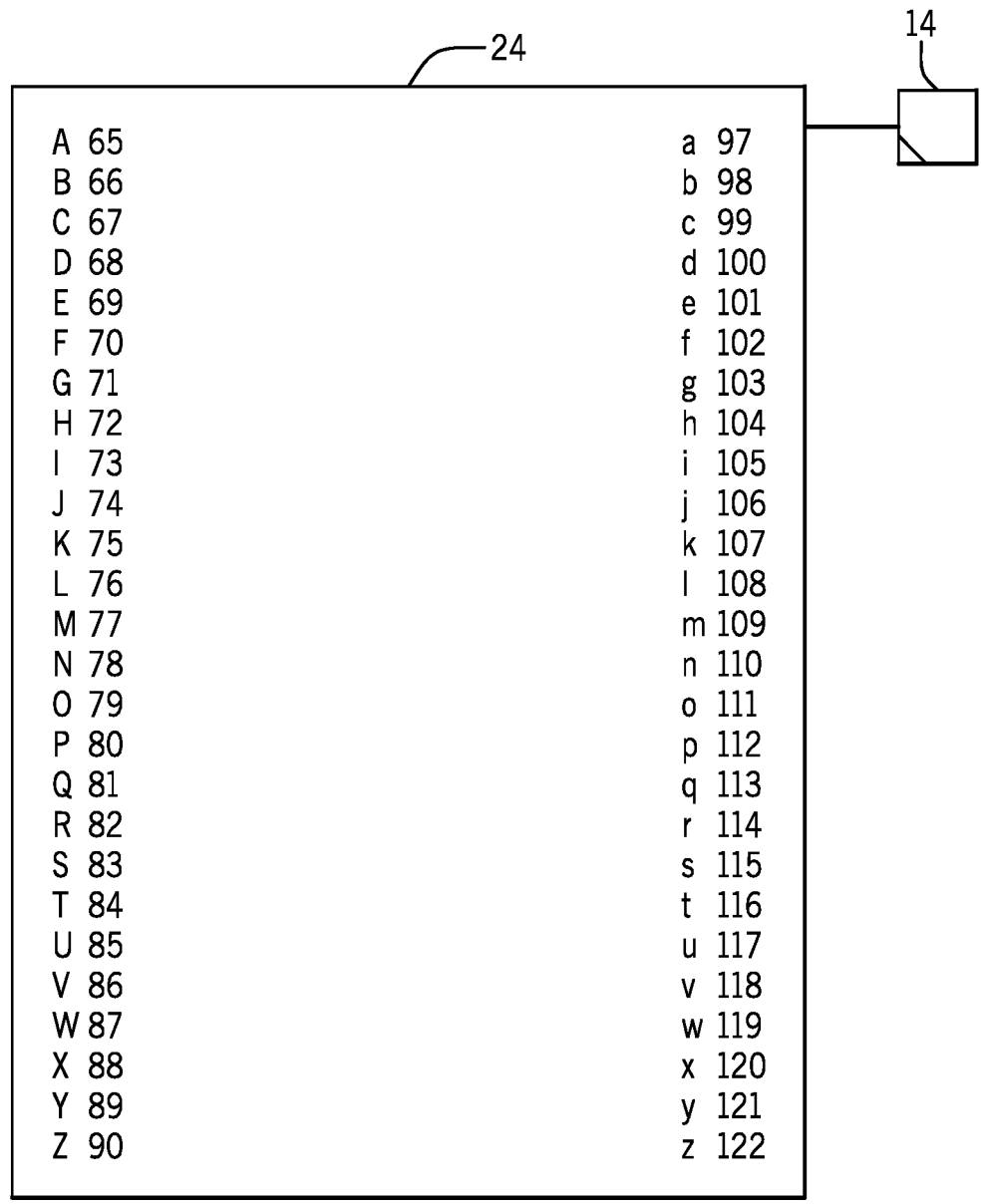
FIG. 3 illustrates alt codes for producing English language characters on a non-English keyboard, wherein the alt codes are assembled in a lookup table of a system in accordance with embodiments described herein.

FIG. 3 illustrates alt codes for producing English language characters on a non-English keyboard, wherein the alt codes are assembled in a lookup table 26 of the system 14 in accordance with present embodiments. As illustrated, each English language character may be reproduced using the alt button in combination with a specific combination of numbers. For example, the lowercase "k" is produced by pressing alt and the number combination 107. In contrast, a capital "K" is produced by typing alt in combination with the number combination of 75. Accordingly, if the user were to type in a username of "Citcat" on a foreign keyboard they would need to push the following keys: alt+67, alt+105, alt+116, alt+99, alt+97, alt+116. The difficulty in pushing all of these keys correctly to type in only six characters may lead to the hacker making one or more mistakes that may indicate use of a foreign keyboard and thus indicate that a bad actor is attempting to gain access to the account. It should also be recognized that longer usernames and passwords increase the complexity of the combinations and may therefore lead to more opportunities for the hacker to make a mistake. Likewise, uses associated with drafting text for communications, form entries, and so forth increase the likelihood of detection. Detection of such uses may be facilitated by separate lookup tables with typical errors associated with the use of these alt codes (e.g., entry of "6", "7", or "67" where a "c" would typically be typed).

Figure 4:
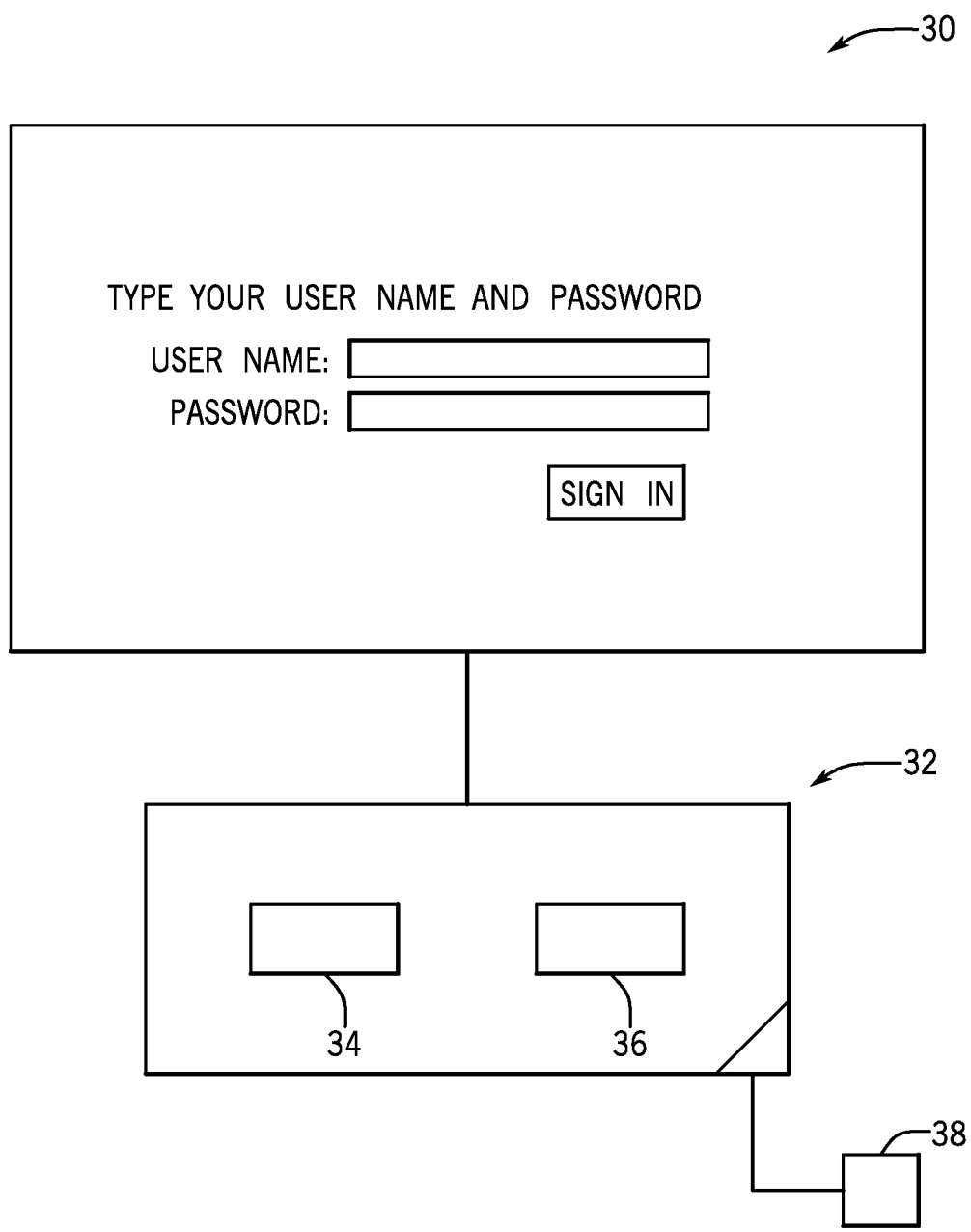
FIG. 4 illustrates a login screen for a financial institution produced by a server, wherein the server is monitored by a system in accordance with embodiments described herein.

FIG. 4 illustrates an account login screen 30 produced by a server 32. The account may be a social media account, store account, email account, work account, or the like. In the illustrated embodiment, the server 32 includes a processor 34, such as the illustrated microprocessor, and a memory device 36. The server 32 may also include one or more storage devices and/or other suitable components. The processor 34 may be used to execute software, such as software for producing the login screen 30 and for verifying the username and password provided by a user. In addition to verifying the username and password, the server 32 may include and run a keyboard detection system 38. The keyboard detection system 38 may operate to analyze the username and password for anomalies in the username and password that may be indicative of the user using a foreign keyboard. The use of a foreign keyboard to access an account may be an indicator that the user is a hacker attempting to gain access to an account. In other embodiments, entries other than or in addition to the username and password may be monitored by the keyboard detection system 38 to facilitate identification of foreign keyboards (or otherwise inconsistent keyboards).

As explained above, a hacker may use special codes such as alt codes on a foreign keyboard for typing language characters. For example, a Cyrillic keyboard may be used to type English characters. In some embodiments, the keyboard detection system monitors the input of usernames and/or passwords in real time to detect mistakes that a hacker may enter while entering a username and/or password using special codes, such as alt codes. In some embodiments, the keyboard detection system checks the username and/or password for mistakes associated with the use of a foreign keyboard after the username and password are submitted to the server for verification. While alt codes are discussed throughout this application, it should be understood that the keyboard detection system may detect other codes that enable a hacker to create certain language characters on a foreign keyboard. Further, as previously noted, any character entry may be considered and analysis is not limited to username and/or password.

Figure 5:
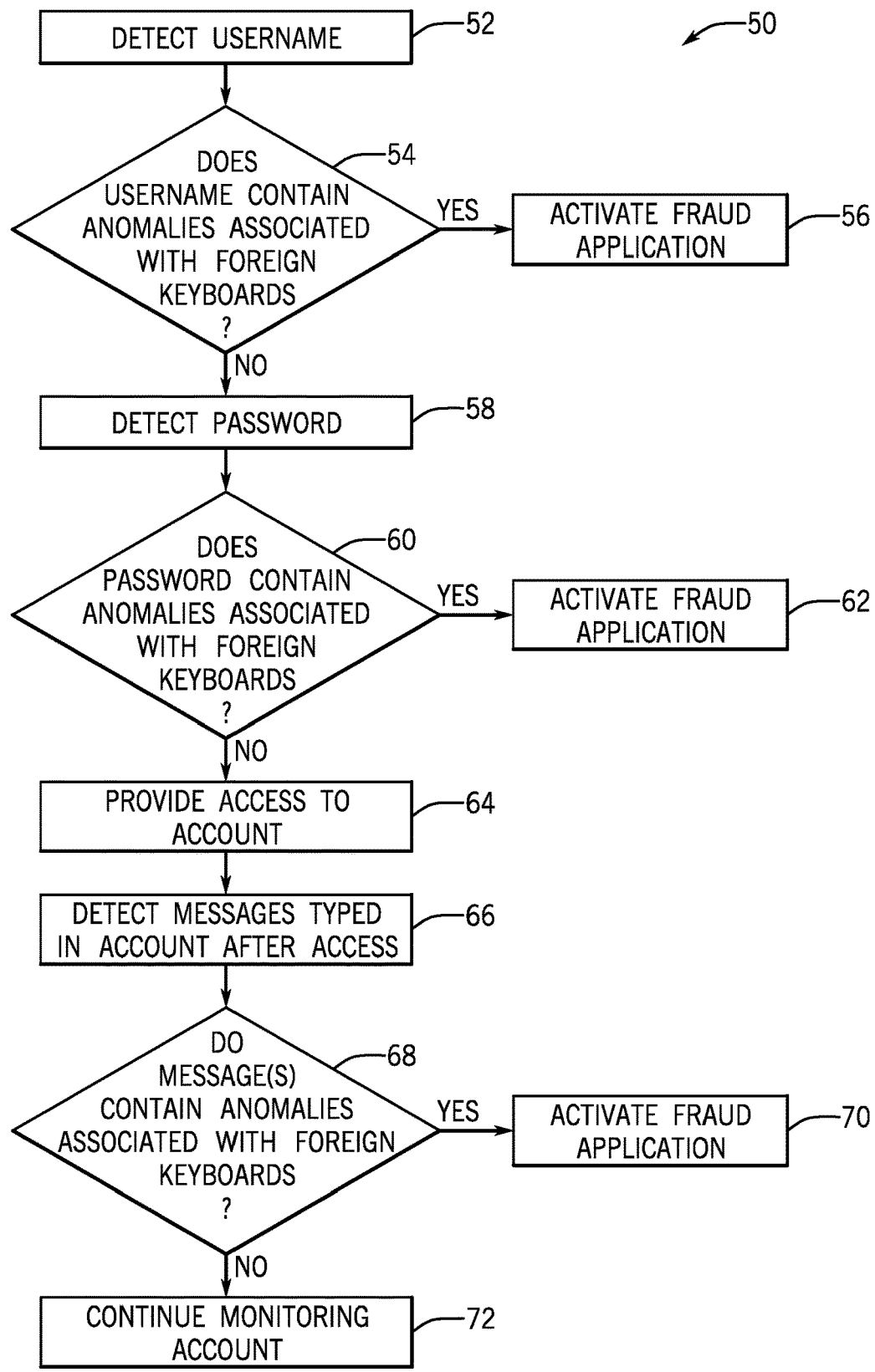
FIG. 5 illustrates a method of operation of a keyboard detection system that detects and blocks foreign hackers from unauthorized access to an account, in accordance with embodiment described herein.

FIG. 5 illustrates a method 50 of operation of a keyboard detection system for detecting and defeating hackers from fraudulently accessing and using an institution's accounts. The account may be a social media account, financial account, store account, or the like. The method 50 begins with the keyboard detection system detecting the characters input into the username field of the login screen 30, block 52. Character input may be monitored in real time or checked after the username is submitted for verification. As the keyboard detection system detects the characters of the username, the system checks the characters and combinations of characters against codes used by foreign keyboards to produce the characters, block 54. In some embodiments, the keyboard detection system detects that the account access attempt is coming from a specific geographic region, such as Kansas. The keyboard detection system recognizes that keyboard layouts in this region should primarily be English language keyboard layouts. Accordingly, if the input errors are associated with a non-English keyboard layout, the keyboard detection system recognizes the discrepancy between what the expected keyboard layout should be and what the actual keyboard layout is. Similarly, if an account holder is associated with a particular keyboard layout, such as an English keyboard layout, and the keyboard detection system detects a different keyboard layout, the keyboard detection system recognizes the discrepancy. As explained above, the term foreign keyboard layout should be understood to include a keyboard layout that is not associated with a detected geographic region or a particular user.

For example, if a legitimate username for an account is "Rockstar50" and the characters typed into the username field are "Ro99kstar50" or "Ro98kstar50" the keyboard detection system identifies the 98 or 99 as an anomaly indicative of a foreign keyboard because a more common mistake on an English character keyboard for "c" would be "v," "x", "d" or even "kc" instead of "98" or "99." Moreover, the keyboard detection system may recognize that alt+99 is the code for "c" and that alt+98 is associated with "b," which is the preceding character in the English alphabet. The keyboard detection system may also detect anomalies in spellings that may be associated with a user using a foreign keyboard by comparing the username and/or password to English words and/or against the institutions database of usernames and/or passwords. For example, if the username is "RoCkstar50" and the characters typed into the username field are "RoLkstar50" the foreign keyboard monitoring system and detection system identifies "L" as an anomaly indicative of a foreign keyboard because alt+67 is the code for "C" and alt+76 is associated with "L," thus indicating that the user transposed the numbers of the alt code for capital "C" and instead typed the alt code for capital "L."

In some embodiments, the user may actually push a key on the foreign language keyboard that normally generates a foreign character on a foreign computer. However, when the key is pushed an unprintable character is generated on the login screen 30 because the program may only recognize English language characters. Some examples of unprintable characters may include ₩, い, 嘏, 噉. The keyboard detection system is programmed to recognize these characters as mistakes from a foreign keyboard and in response flags the session and account for heightened scrutiny.

If the keyboard detection system detects an anomaly in the user name, the method 50 sends a signal that activates a fraud application program, block 56. As will be explained in more detail below, the fraud application may increase the security surrounding the account. This may include additional security questions after entering the correct name and password.

The keyboard detection system also detects the password entered into the password field of the user login screen 30, block 58. Character input maybe monitored in real time or checked after the password is submitted for verification. As the keyboard detection system detects the characters of the password, the system checks the characters and combinations of characters against codes used by foreign keyboards, block 60. For example, if a legitimate password for an account is "ArrowSmith1970" and the characters typed into the username field are "Arr111wSmith1970" or "Arr112wSmith1970" the keyboard detection system identifies the 111 or 112 as an anomaly indicative of a foreign keyboard because a more common mistake on an English character keyboard for "o" would be "p," "i", or "l" instead of "111" or "112" because they are the closest keys to "o" on an English keyboard. Moreover, the keyboard detection system may recognize that alt+111 is the code for "o" and that alt+112 is associated with "p," which is the preceding character in the English alphabet. The keyboard detection system may also detect anomalies in spellings that may be associated with a user using a foreign keyboard. For example, if the username is again "ArrowSmith1970" and the characters typed into the username field are "ArrowRnith1970" the foreign keyboard monitoring system and detection system identifies that "R" as an anomaly indicative of a foreign keyboard because alt+83 is the code for "S" and that alt+109 is associated with "m," thus indicating that the user shifted the alt code by one number twice for two different inputs thus spelling "Rn" instead of "Sm."

In some embodiments, the user may actually push a key on the foreign language keyboard that normally generates a foreign character on a foreign computer. However, when the foreign language key is pushed an unprintable character is generated on the login screen 30 because the program may only recognize English language characters. Some examples of unprintable characters may include ₩, い, 嘏, 噉. The keyboard detection system is programmed to recognize these characters as mistakes from a foreign keyboard and in response flags the session and account for heightened scrutiny. Again, if the keyboard detection system detects an anomaly in the password, the method 50 sends a signal that activates a fraud application program, block 62. If no anomaly is detected, the user gains access to the account, block 64.

However, even after gaining access to the account, the method 50 may continue monitoring activity on the account to detect possible use of a foreign keyboard. That is, the method 50 may monitor information and/or messages typed after accessing the account, block 66. If the user types information and/or messages in a social media account, email account, banking account, etc. they may contain mistakes associated with a foreign keyboard layout (i.e., mistakes similar to those discussed above), block 68. If the message(s) contain mistakes that could be attributed to a foreign keyboard, the keyboard detection system may activate the fraud application/program, block 70. If no anomalies are identified, the keyboard detection system continues to monitor a user's account activity, block 72.

Figure 6:
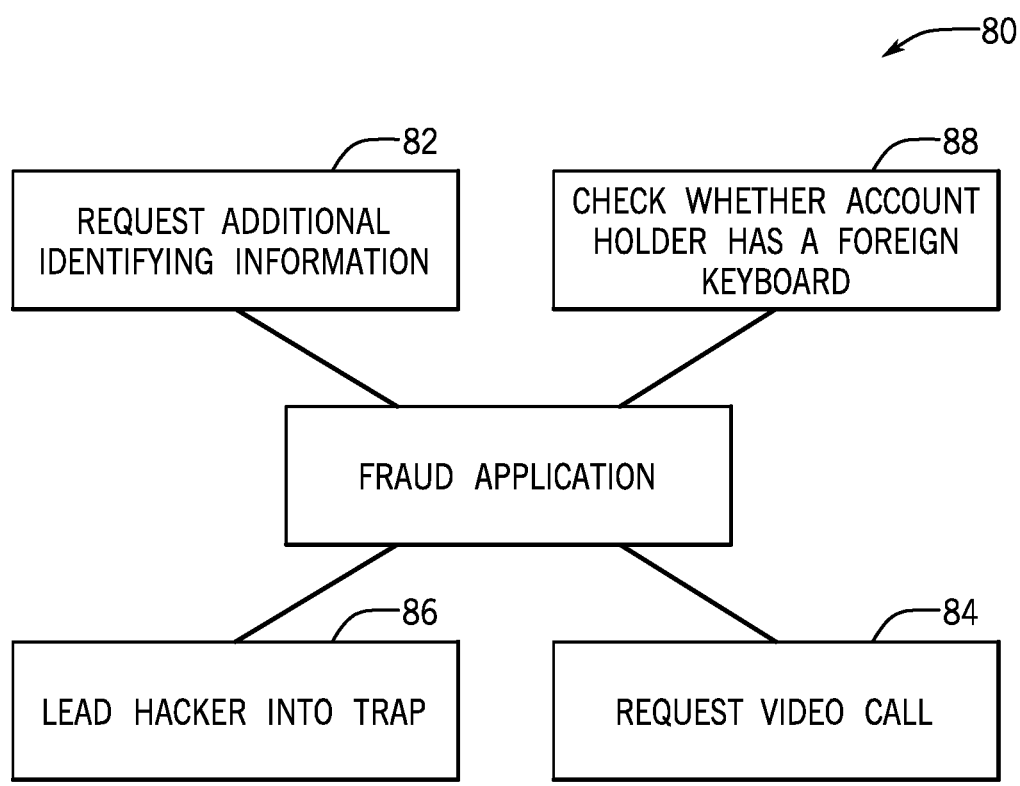
FIG. 6 illustrates a schematic of a fraud assessment application/program, in accordance with embodiments described herein.

FIG. 6 illustrates a schematic of a fraud application/program 80. As explained above, the server 32 may activate the fraud application 80 in response to detection of an anomaly. Anomalies may include unprintable characters, numbers associated with conversion codes (e.g., alt codes), as well as misspellings indicative of user using a foreign keyboard. When activated, the fraud application 80 may provide a variety of options in dealing with a potential hacker. For example, the fraud application 80 may provide additional or more specific identification questions in order to verify the identity of the user, block 82. These questions may include questions about their family and their accounts, among others. The fraud application 80 may also provide the option of conducting a video call in order to confirm that the caller is in fact the customer, block 84. For example, the customer may provide their photo to the institution during enrollment, which may then be used to verify access to the account. In some embodiments, the fraud application 80 may also facilitate entrapment of a hacker by providing access to an account other than the customer's account, block 86. For example, providing access to the false account may facilitate capture of the hacker and/or proof that a crime has been committed while still protecting the actual account of the customer. The fraud application may also check whether the account is registered to provide access using a foreign keyboard, block 88. For example, during registration the account holder may indicate that they will use a foreign keyboard when accessing the account. This information may be stored by the fraud application and accessed if a foreign keyboard is detected. The fraud application may then allow attempts to access the account using a foreign keyboard because of the previous registration.

Systems utilized to detect and prevent unauthorized access based on detection of a foreign keyboard may include algorithms that detect words, algorithms that use lookup tables, and/or algorithms that use combinations thereof.

Figure 7:
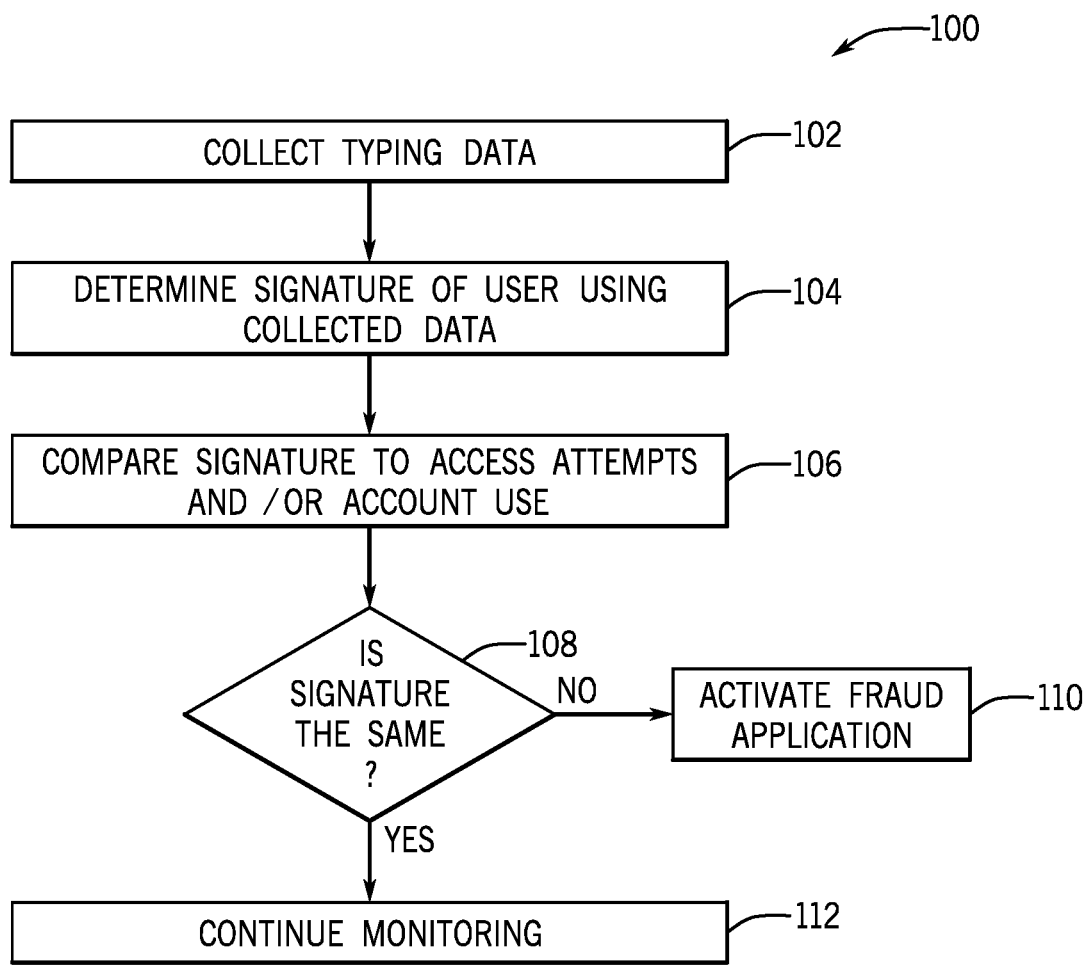
FIG. 7 illustrates a method of operation for a keyboard detection system that verifies a user's identity by monitoring keyboard input, in accordance with embodiments described herein.

FIG. 7 is a method 100 of operation for a keyboard detection system that verifies a user's identity by monitoring keyboard input. The method 100 begins by collecting keyboard input associated with a particular account, block 102. This data may then be used in machine learning algorithms to produce a signature for the associated account. More specifically, each account holder may have particular habits when accessing an account or when typing information during use of the account, such as typing errors. Overtime the collection of these errors and their analysis in a machine learning algorithm may produce a signature that is then associated with a user and their account, block 104. The method 100 may then compare future access attempts as well as use of the accounts to the signature to determine if the actual account owner is using the account, block 106. The method 100 then determines if the account activity (i.e., typed information) reflects the signature associated with the account, block 108. For example, an account holder may typically type "sumit" instead of "submit" the keyboard detection system may recognize this as a common error by the account holder and therefore enable the account holder to continue using the account without heightened security. In contrast, if the user makes mistakes that are not typically associated with the account, the keyboard detection system may flag the account for heightened scrutiny because an initial analysis indicates someone other than the actual account holder is using the account. These mistakes may include characters produced by a keyboard layout not associated with the account. For example, a Chinese character produced by a Chinese keyboard layout may be detected as an anomaly when the account is associated with an English language keyboard layout. If an anomaly is detected, that is a deviation from the signature, the method 100 may activate a fraud application, similar to that described above to protect the account, block 110. If the signature is the same, the keyboard detection system continues monitoring keyboard input, block 112.

Figure 8:
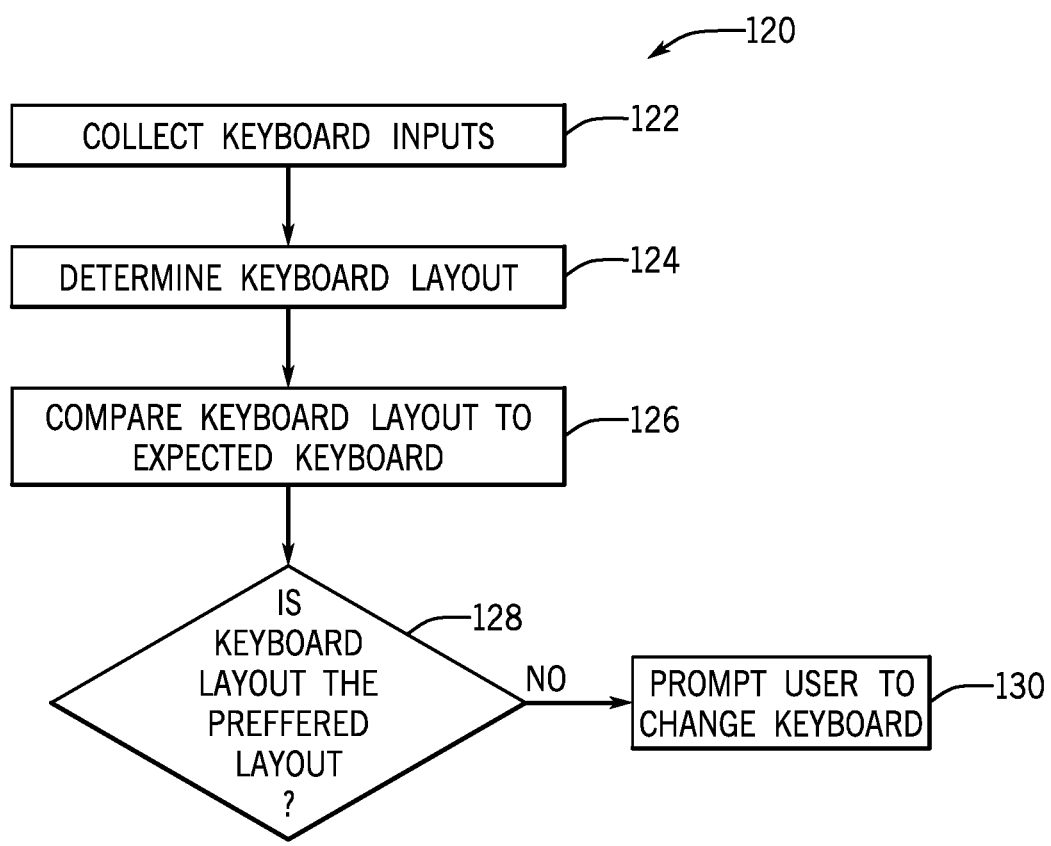
FIG. 8 illustrates a method of operation for a keyboard detection system that prompts a user to switch keyboard layouts, in accordance with embodiments described herein.

FIG. 8 illustrates a method 120 of operation for a keyboard detection system that prompts a user to switch keyboard layouts. The method 120 begins by collecting keyboard input as a user types in a username, password, and/or data while using the account, online form, or the like, block 122. The keyboard detection system receives this data and determines what keyboard layout is being used, such as a Korean, Chinese, or Cyrillic keyboard layout, block 124. In order to detect which keyboard is being used, the keyboard detection system detects anomalies associated with particular keyboards. These anomalies may be misspellings and/or characters not associated with the language of the account. The detected keyboard layout is then compared to an expected keyboard of the account holder or user, block 126. If the keyboard layout does not match the preferred keyboard of the user or of the account, block 128, the keyboard detection system sends a prompt to the user. The prompt may ask the user to change keyboard layouts to facilitate accessing and/or using the account, block 130.

The technical effects of the systems and methods described herein include a foreign keyboard detection and monitoring system that facilitates identification of hackers and defeats unauthorized attempts to access the accounts of legitimate customers of an institution.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A keyboard detection system, comprising:
a database comprising database information associating a first plurality of characters of a first language with a second plurality of characters corresponding to keystrokes used to produce the first plurality of characters via a keyboard of a second language different from the first language;
one or more processors; and
memory communicatively coupled to the one or more processors, wherein the memory stores instructions configured to cause the one or more processors to:
receive input data comprising a first set of characters, wherein the input data is related to a credential associated with an account;
compare the input data to a second set of the second plurality of characters based on the database information;
determine that the input data and the second set of the second plurality of characters comprise a common subset of characters;
request additional information associated with the account in response to determining that the input data and the second set of the second plurality of characters comprise the common subset of characters; and
limit access to the account in response to detecting the input data comprises one or more unprintable characters.

2. The keyboard detection system of claim 1, wherein the instructions are configured to cause the one or more processors to compare the input data to the second set of the second plurality of characters in response to determining that the input data does not match the credential.

3. The keyboard detection system of claim 1, wherein the instructions are configured to cause the one or more processors to block access to the account in response to determining that the input data and the second set of the second plurality of characters comprise the common subset of characters, wherein the common subset defines a threshold amount of common characters.

4. The keyboard detection system of claim 1, wherein the credential comprises a username or password.

5. The keyboard detection system of claim 1, wherein the additional information comprises a photo associated with a user of the account.

6. The keyboard detection system of claim 1, wherein the second plurality of characters comprises alt codes used to produce the first plurality of characters via the keyboard of the second language.

7. The keyboard detection system of claim 1, wherein the second set of the second plurality of characters comprises all of the second plurality of characters.

8. The keyboard detection system of claim 1, wherein the account is associated with an English keyboard, and the keyboard of the second language comprises a non-English keyboard.

9. The keyboard detection system of claim 1, wherein the additional information comprises security questions regarding identifying information associated with a user of the account.

10. A keyboard detection system, comprising one or more processors and memory communicatively coupled to the one or more processors, wherein the memory comprises instructions configured to cause the one or more processors to:
monitor keystroke activity associated with an account;
determine error text representative of a common misspelling of target text based on the keystroke activity, wherein the error text comprises a first plurality of characters, and the target text comprises a second plurality of characters;
receive input data during usage of the account, wherein the input data comprises a third plurality of characters;
determine the input data is a misspelling of the target text based on the third plurality of characters of the input data comprising a subset of the second plurality of characters of the target text;
determine that the third plurality of characters of the input data does not comprise the first plurality of characters of the error text;
provide an alert indicative of potential unauthorized usage of the account in response to determining that the input data is the misspelling of the target text and the third plurality of characters of the input data does not comprise the first plurality of characters of the error text; and
limit access to the account in response to detecting the input data comprises one or more unprintable characters.

11. The keyboard detection system of claim 10, wherein the instructions are configured to cause the one or more processors to not provide the alert indicative of the potential unauthorized usage of the account in response to determining that the third plurality of characters of the input data comprises the first plurality of characters of the error text.

12. The keyboard detection system of claim 10, wherein the input data comprises in-account functions a user carries out after being granted access to the account.

13. The keyboard detection system of claim 10, wherein the instructions are configured to cause the one or more processors to request additional information associated with the account in response to detecting the input data comprises the one or more unprintable characters.

14. A keyboard detection system, comprising:
- a database comprising database information associating a first plurality of characters of a first language with a second plurality of characters corresponding to keystrokes used to produce the first plurality of characters via a keyboard of a second language different from the first language;
- memory comprising instructions stored thereon; and
- one or more processors communicatively coupled to the memory, wherein the one or more processors, upon executing the instructions stored on the memory, are configured to:
  - receive input data comprising a first set of characters entered during usage of an account;
  - compare the input data to a second set of the second plurality of characters based on the database information;
  - determine that the input data and the second set of the second plurality of characters comprise a common subset of characters;
  - limit access to the account in response to detecting the input data comprises one or more unprintable characters; and
  - enable usage of an additional account, instead of the usage of the account, in response to determining that the input data and the second set of the second plurality of characters comprise the common subset of characters.

15. The keyboard detection system of claim 14, wherein the one or more processors, upon executing the instructions, are configured to request additional identifying information from a user in response to determining that the input data and the second set of the second plurality of characters comprise the common subset of characters.

16. The keyboard detection system of claim 14, wherein the one or more processors, upon executing the instructions, are configured to request additional identifying information from a user in response to detecting the input data comprises the one or more unprintable characters.

17. The keyboard detection system of claim 14, wherein the one or more processors, upon executing the instructions, are configured to determine whether a foreign keyboard is associated with the account in response to determining that the input data and the second set of the second plurality of characters comprise the common subset of characters.

18. The keyboard detection system of claim 17, wherein the one or more processors, upon executing the instructions, are configured to enable continued usage of the account in response to determining that the foreign keyboard is associated with the account and that the foreign keyboard is associated with the second language.

19. The keyboard detection system of claim 14, wherein the common subset of characters comprises a threshold quantity of common characters.

* * * * *